Figure 1:
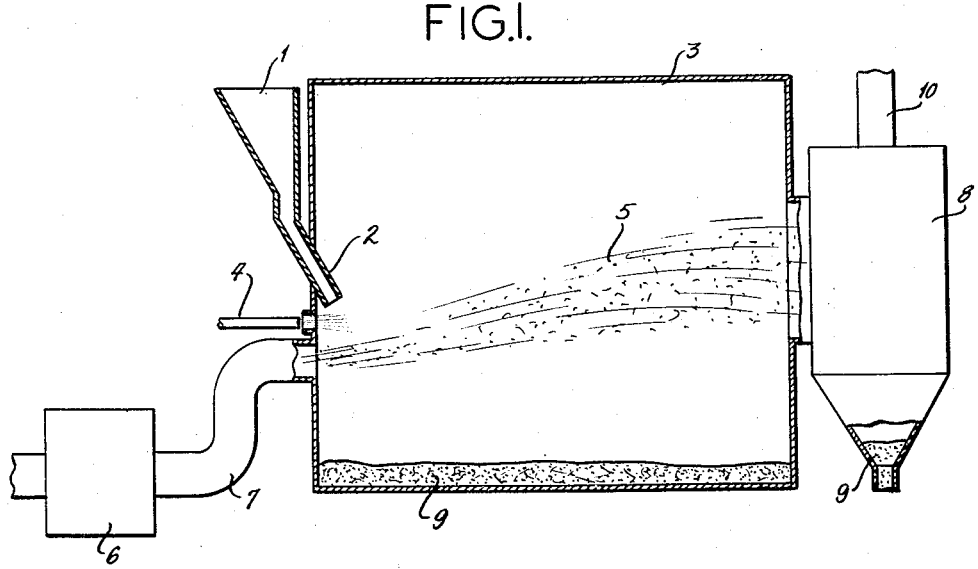

April 29, 1958  E. A. LOUDER ET AL  2,832,686
INSTANTLY SOLUBLE MILK POWDER AND PROCESS FOR MAKING SAME
Filed Sept. 7, 1954  2 Sheets-Sheet 1

INVENTORS:
EARL A. LOUDER
ADRIAN Z. HODSON

By Gravely, Lieder, Woodruff & Wills
ATTORNEYS.

United States Patent Office 2,832,686
Patented Apr. 29, 1958

2,832,686

INSTANTLY SOLUBLE MILK POWDER AND PROCESS FOR MAKING SAME

Earl A. Louder and Adrian Z. Hodson, Greenville, Ill., assignors to Pet Milk Company, St. Louis, Mo., a corporation of Delaware Application September 7, 1954, Serial No. 454,295

4 Claims. (Cl. 99—56)

This invention relates to an instantly soluble milk powder and a process for making same. In particular, it relates to a milk powder which dissolves readily even in cold water by stirring slightly with a spoon, after which it is ready for immediate use. The invention also relates to a process for making highly and instantly soluble milk powder from conventional milk powder which is soluble in water only after vigorous shaking and which preferably should be allowed to set for many hours before consuming. In this process, a product like skim milk powder, whole milk powder, chocolate milk powder or other milk powders are rendered more soluble or more instantly soluble by treatment of the powder.

It has long been a practice of the industry to dry skim milk, whole milk or other milk combinations in spray type or drum type desiccators, resulting in a product which is of a more or less fine texture and rather difficultly soluble in water. To reconstitute the present commercial conventional milk powders, the powder must either be agitated in water with a mixing device or shaken in a container with water until it goes into solution. We propose to treat the above types of powder in such a way that an instantly soluble product will result. While we do not wish to confine our invention to one product, our examples will be concerned with nonfat dry milk solids.

The standard method of manufacturing regular nonfat dry milk solids is substantially as follows: Milk is accepted at the plant usually in whole milk form where it is passed through separators to remove the cream from the milk. The resulting skim milk is pasteurized or preheated to temperatures which will produce a relatively low bacteria count and the resultant skim is condensed in conventional vacuum pans to approximately 30 to 45% total solids.

After condensing the skim milk, it may or may not be pumped to a cold storage tank. In either case, it is usually again preheated to a temperature of approximately 140 to 160° and pumped with relatively high pressures to a powder box.

The powder box consists, as a rule, of a large heating chamber. Hot air is fed into the box at a temperature ranging from 280 to 350° F. The milk is sprayed into the box so that it enters the box in a fine mist where it comes in contact with the heated air. The heated air causes immediate evaporation of the moisture thus permitting the solids of the milk to drop to the bottom of the box in a manner similar to the falling of snow flakes. When air comes in contact with the milk it takes up the moisture therein and the temperature of the outgoing air from the box is reduced to approximately 175° to 200° F. The temperature of the air in the box is usually between 190° and 200° F.

The types of powder produced in this manner are the types that are found in commerce and are referred to herein as conventional powders. They are usually very fine and very white and produce a good flavored milk product, but they are difficultly soluble. Usually, they must be placed in a leakproof container, shaken thoroughly, and then allowed to set overnight to obtain preferred results including better flavor.

One of the principal objects of the present invention is to provide a milk powder which can be packaged in a paperboard container or a jar and which dissolves instantly and easily when dropped into a glass of cold water and which does not produce objectionable protein flakes or solid particles in solution. Another object is to provide a simple, economical, and commercial process for making instantly soluble milk powder from conventional milk powder.

Still another object is to provide an instantly soluble milk powder which can be stirred in with a spoon and which allows the milk made therefrom to be consumed immediately without first being vigorously shaken and then allowed to set for a long period of time as is required for conventional milk powder.

These and other objects and advantages will become apparent hereinafter.

The present invention is embodied in a process wherein conventional milk powder is allowed to move or flow in a stream from a feeder, the individual particles of the stream being positioned closely to one another, said milk powder stream being subjected to the action of steam immediately below said feeder, thereby causing the outer surface of each particle to become moist instantly thereby resulting in substantial numbers of particles joining together in situ to form agglomerates of individual particles, said agglomerates instantly losing most of their moisture as they move through the heated air to the discharge portion of the powder box. The invention is also embodied in the instantly soluble milk powder obtained from said process, said powder comprising agglomerates having great surface area per unit volume so that they are more readily and instantly soluble in water, said agglomerates containing a higher percentage of soluble portions and having the lactose or more soluble portions thereof at or near the surface thereof.

Figure 2:
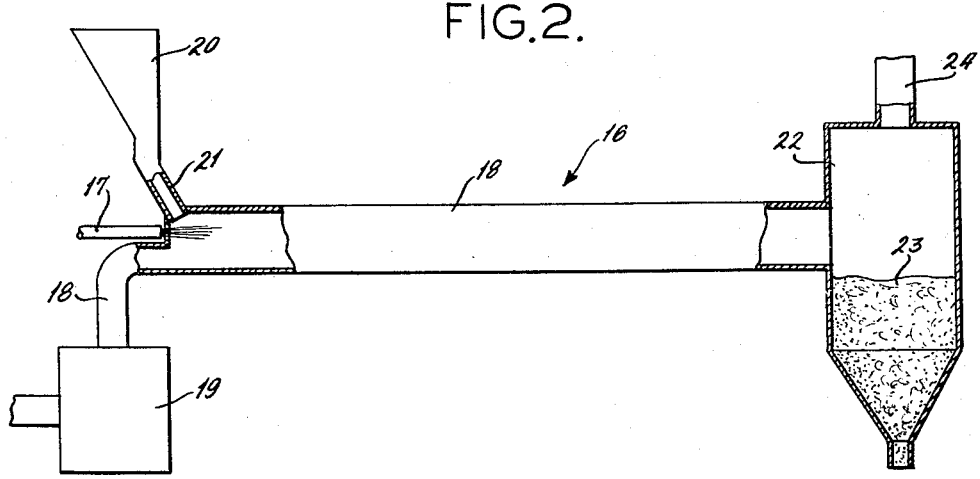
Figure 4:
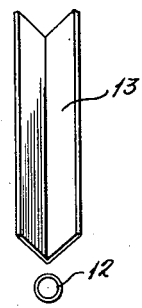
Figure 3:
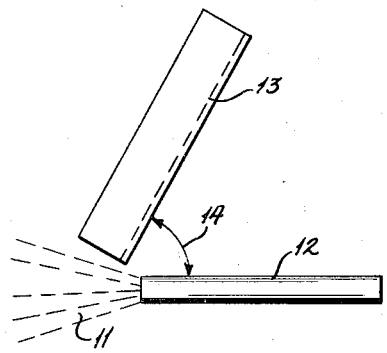
Figure 6:
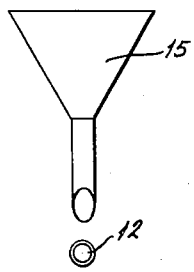
Figure 5:
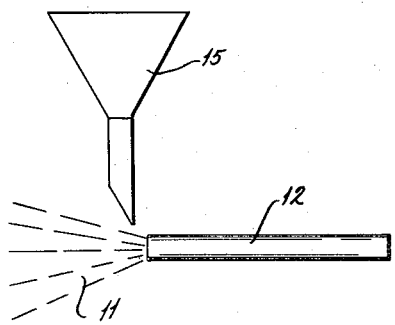
Figure 7:

The invention further consists in the process hereinafter described and claimed, and in the instantly soluble milk powder made by said process. In the accompanying drawings which form part of this specification and wherein like numerals and symbols refer to like parts wherever they occur:

Fig. 1 is a diagrammatic side view of a flash powder steamer in combination with a box drier, Fig. 2 is a diagrammatic view of a flash powder steamer with a tube drier, Fig. 3 is a diagrammatic side view of a flash steamer in combination with an inclined trough feeder, Fig. 4 is an end view thereof, Fig. 5 is a diagrammatic side view of a flash steamer in combination with a funnel feeder, Fig. 6 is an end view thereof, and Fig. 7 is a top plan view of several agglomerates of instantly soluble dry milk powder formed by said process.

We have found that a new and improved instantly soluble dry milk powder can be formed from present ordinary or conventional dry milk powders which are not as soluble. Our process comprises instantly wetting the conventional powder and then in sequence instantly drying said powder without a delay between steps.

Most of the conventional dry milk powders presently on the market have been made from skim milk condensed to between 30 and 45% solids before spray drying and dried to between 2 and 3½% moisture. These are called extra grade, low heat commercial powders. The term extra grade means that the powder is designed to be used for human consumption. The term low heat refers to dried milk which has not been exposed to temperatures in excess of those necessary for pasteurization. The present process also increases the solubility of high heat powders which are designed for the baking industry.

The first step of our process comprises instantly increasing the moisture content of conventional milk powder with moist heat. The moisture content of conventional milk powder is initially about 2 to 3½%. This is raised to 4 to 9%, preferably to 5½% by wetting the conventional milk powder with steam while the milk powder particles are in contact with one another. This wetting followed by immediate drying (as hereinafter described) causes the original particles to adhere to one another thereby forming coarse aggregated particles or agglomerates of loose porous structure. This loose porous structure, which can be described as "coral-like" or "sponge-like," readily wets because of its capillary action and readily dissolves or disperses in water when the powdered milk is reconstituted.

This wetting or steaming step also partially converts and changes the distribution of the various kinds of lactose in the powder. The instant nonfat dry milk solids prepared by our process are characterized by a relatively high content of beta lactose and a relatively low content of alpha lactose. Beta lactose is a highly soluble form of lactose but alpha lactose hydrate is a relatively insoluble form of lactose but readily dispersible. Alpha lactose anhydrous is relatively insoluble. Our product contains a small percentage of alpha lactose. The lactose, whether alpha or beta, hydrate or anhydrous, in the ordinary or conventional dry milk product of commerce is distributed throughout the individual particles. The steam treatment, followed by immediate drying, causes the lactose, regardless of type or form, in our product to be at or near the surface of the particle. This, too, increases the solubility of the powder.

Referring now to Fig. 1, we accomplish the first step of instant wetting as follows. We allow the conventional milk powder stored in a hopper 1 to move in a continuous stream from a trough 2 or other suitable source so that the particles thereof are positioned closely to one another as they enter the steam. The end of the trough 2 is positioned within a powder box or heated chamber 3. A nozzle 4 is positioned immediately below and behind the lower end of the trough 2 and directs a stream of steam into said particles while they are close together, thereby moistening the surface of each particle and causing it to adhere to any article which it might contact. The instant wetting causes the particles to form agglomerates having large surface area per unit volume. The agglomerates each comprise a plurality of individual milk powder particles which have become cemented together to form the rough porous coarse agglomerates. At the same time, the force of the steam disperses the wetted powder so that it does not become too wet, and can be used to break down conventional milk which might be composed of larger than average particles. Powder which is insufficiently moistened is unchanged and powder that is overly moistened and then dried may be even more insoluble than the original conventional powder so that it is important to keep the moisture of the wetted powder between about 4 to 9%, preferably about 5½%.

Our method of producing an instantly soluble powder consists of a controllable process of steam treating so that a maximum of highly soluble powder results without changes in flavor or other undesirable properties.

While we do not wish to confine ourselves to any one particular method of introducing the powder into the flowing steam, it has been found that allowing the powder to slide down an inclined V-bottom trough at an angle of about 60° with the horizontal is especially effective. The V-bottom in the trough causes the powder to fall directly in the center of the stream of steam. One or more nozzles can be used to obtain the desired results. If desired, a plurality of nozzles each having a feeder or trough associated therewith can be used.

Another method of introducing the powder into the stream is by the use of a funnel which drops the powder directly into the stream of steam. However, care must be exercised to keep the powder flowing in a continuous stream and to control the distance of free fall so that the powder does not fall through the steam without becoming properly wetted. Whatever method of introducing the powder is used, it is essential that particles thereof be in contact or very close to one another until introduced to the stream of steam. Known methods of handling powder such as screw conveyors, vibrating troughs, chain drags or other means can be used to carry the powder from a hopper or bin to the inclined trough or funnel.

The second step of our process comprises instantly reducing the moisture content of the wetted milk powder. This is done preferably by immediately allowing the moistened powder to move into a hot air stream 5 in the powder box 3 such as is ordinarily used for spray drying milk. The hot air is supplied by an air heater 6 and a fan, not shown, through the duct 7 and into the box 3 at a point below the nozzle 4. The hot moistened air is directed into a dust collector 8 which separates out any treated milk powder 9 which did not fall to the floor of the box 3 and exhausts the hot air through the duct 10.

A powder box or drying chamber such as described in the expired Rogers Patents No. 1,266,001 and No. 1,243,878 is suitable. Another method of drying is in a tube which conveys a stream of hot air as a drying medium. The moisture of the steam and powder are directed into the tube along with hot air, as best shown in Fig. 2 which will be explained hereinafter, and the powder is collected and separated from the air and water vapor mixture in a cyclone type collector. This type of drier offers economy of space and equipment, but oven type driers or tunnel driers might be used.

By way of illustration, but not by way of limitation, the following examples are typical of the process of this invention for forming an instantly soluble dry milk powder.

*Example 1*

The process was successfully carried out on a laboratory scale in which the steam pressure was ten pounds. As best shown in Figs. 3 and 4, conventional nonfat dry milk solids were fed into a jet of steam 11 coming from a pipe or nozzle 12 at the rate of thirty pounds per hour. The nozzle 12 was one-half inch below and one-half inch behind the lower end of an angularly positioned milk powder feeding trough 13. The angle 14 between the feeding trough and the center line of the steam flow was 60°. The powder was wet to a moisture content of 6.5 per cent, and then dried in a hot air oven, not shown, at 145° F. to a final moisture content of 2.5 percent. The resultant product was an instantly soluble powder which readily stirred into cold water to form a pleasing drink which could be consumed immediately. This reconstituted product was very similar to fresh skim milk.

If desired, the powder can be supplied by a funnel feeder 15 as best shown in Figs. 5 and 6.

*Example 2*

The process was successfully carried out on a pilot plant scale using a box drier 3, shown in Fig. 1, in which the steam pressure (closed line) was 120 pounds with a half-inch steam line opening into two, one-half inch nozzles 4 spaced in a horizontal plane two inches apart from center to center. The steam nozzle 4 was 12 inches behind the lower end of the milk powder feeding trough 2 and the top of the steam stream was one inch below the lower end of the trough 2. Conventional nonfat dry milk solids were fed in a stream at a rate of 700 pounds per hour. The treated powder was, immediatley after treating, dried in the hot air chamber 3 which was twelve feet long, eight feet wide and nine feet high. An air heater 6 in the air duct 7 raised the temperature of the incoming air to 310° F. The box temperature in operation was 180°–190° F. The hot air was directed into a dust collector 8 which separated out any powder 9 which did not fall to the floor of the hot air chamber 3 and exhausted the hot air through the duct 10.

The initial moisture content of the conventional powder was 2.0 to 3.5 percent. After treatment the moisture content was also 2.0 to 3.5 percent. The resultant product was an instantly soluble powder which readily stirred into cold water to form a pleasing reconstituted skim milk.

*Example 3*

The process was successfully carried out on a pilot plant scale with a tube drier 16 as best shown in Fig. 2 using a steam pressure (closed line) of 120 pounds with a half-inch steam line 17 opening into two, one-half inch steam nozzles spaced in a horizontal plane two inches apart center to center. The steam treatment and drying was carried out in a sheet metal drying tube 18 twelve feet long, fourteen inches wide and twenty-six inches high. The hot air was introduced in the bottom fourteen inches of the tube 18 from an air duct 18 connected to an air heater 19. The steam and milk powder were introduced immediately above the hot air stream as in the previous example through a feeder 20 having a trough 21 connected thereto. The tube 18 was connected to a cyclone collector 22 for separating the treated powder 23 from the air and water vapor. The hot air was forced in under pressure from a fan, not shown, and the air and water vapor were exhausted from the cyclone collector 22 through the duct 24 by a fan of slightly greater capacity. The nonfat dry milk solids were fed at a rate of 900 pounds per hour. The inlet hot air temperature was 310° F. The drying tube temperature during operation was 200° F. The initial powder moisture was 3.7 percent. The final powder moisture content was 3.5 percent. The product was an instantly soluble powder, which readily stirred into cold water to form a pleasing reconstituted skim milk.

*Example 4*

The process was successfully carried out on a small plant scale with a boiler steam pressure of 125 pounds. When in operation with a ¾-inch line wide open a gauge 10 feet from the steam jet read 90 pounds. The single ¾-inch steam nozzle was 11 inches behind the end of the milk trough. The milk trough was one inch above the main steam stream. Conventional nonfat dry milk solids were fed at a rate of 1392 pounds per hour of fine nonfat dry milk powder of 4.16 percent moisture content. The moisture content of the powder immediately after steaming was about 5.0 percent. The powder was immediately thereafter dried in the drying chamber of a small conventional spray dryer in which the incoming air temperature was 225° and the box temperature 187° F. The final moisture content was 2.6 percent. The product was an instantly soluble powder which readily stirred into cold water to form a pleasing reconstituted skim milk.

Referring now to the process in general, the pressure and moisture content of the steam is governed by the size and percentage of the milk solid content and by the initial moisture content of the conventional powder which is used to form instantly soluble dry milk powder. Sufficient moisture should be added to instantly raise the moisture content to about 5½% and sufficient heat should be supplied to instantly reduce the moisture to about 2 to 3½%. If the conventional powder has large particles, then the pressure of the steam can be used to physically break up these large particles to insure proper wetting. The process should be controlled to obtain agglomerates, a substantial portion of which will not pass through about a 100 mesh screen, and with a minimum of fines. This process does not adversely affect the mineral salts or the protein content of the conventional powder. The foregoing examples are merely examples of slightly different ways of accomplishing the instant wetting and instant drying that must be applied to a stream of closely positioned particles of powdered milk. It is believed that the instant addition of the moist heat and subsequent instant drying converts the insoluble milk sugars to a more soluble form and stabilizes the protein so that on reconstitution there is no flaking or curding even in relatively cold water.

Various commercial conventional brands of powdered milk of different solids contents and lactose contents have been subjected to our process and the following table illustrates the changes in the milk powder which are brought about by the instant wetting and instant drying. The table first gives values of untreated conventional powder and then resultant values after said powder has been treated by our process.

| Conventional Brands of Powder With Solids Content | (Percentage of Total Lactose) | | |
|---|---|---|---|
| | Percentage Total Lactose | Alpha Lactose | Beta Lactose |
| A—35% untreated | 52.2 | 39.1 | 60.9 |
| A—35% treated | 51.8 | 31.9 | 68.1 |
| B—40% untreated | 53.1 | 28.9 | 71.1 |
| B—40% treated | 52.2 | 24.1 | 75.9 |
| C—untreated | 55.8 | 36.9 | 63.1 |
| C—treated | 56.7 | 30.8 | 69.2 |
| D—untreated | 50.8 | 35.4 | 64.6 |
| D—treated | 52.65 | 26.5 | 73.5 |

Our invention can be used for improving the solubility or dispersibility of nonfat dry milk solids, other skim milk powder, whole milk powder, chocolate or cocoa milk and other food products whose principal ingredient is milk solids. While the solubility of all products is improved they are not all equally soluble in cold water. While whole milk powder treated by our process has improved solubility, it perhaps can be considered instantly soluble only if reconstituted with warm water, since the butter fat must be melted before the powder disperses readily. Except for that, however, our product is instantly soluble. Water warmed to 100° F. will dissolve or disperse the powder but water at 120° F. dissolves or disperses it still more readily. Powders made with cocoa may be instantly dispersible but the cocoa may tend to settle out on standing. For the most part we have worked with nonfat dry milk solids and our invention is particularly adaptable for making this product readily soluble.

Our process gives a superior product and permits the use of conventional and readily available equipment for its production.

This invention is intended to cover all changes and modifications of the examples of the invention herein chosen for purposes of the disclosure, which do not constitute departures from the spirit and scope of the invention.

What we claim is:

1. A method of converting dry powdered milk particles into coarse agglomerates of loose porous structure which comprises producing a stream of milk powder the particles of which are positioned closely adjacent to one another, heating and wetting said particles by releasing a stream of steam into said stream of particles while they are close together for instantly increasing the moisture content of the milk powder and for moistening the surface of each particle thereby forming agglomerates, and then instantly reducing the moisture content of the agglomerates by substantially immediately contacting the agglomerates with a hot gaseous stream passing adjacent to the area in which the particles are moistened thereby forming instantly soluble agglomerates having a relatively large surface in relation to volume and ready for immediate use.

2. A method of converting conventional dry powdered milk particles having an initial moisture content of less than 4% into coarse agglomerates of loose porous structure which comprises producing in an enclosure a continuous stream of milk powder the particles of which are positioned closely adjacent to one another, heating and wetting said particles by releasing a stream of steam into said stream of particles while they are close together for instantly increasing the moisture content of the milk powder to between about 4% to about 9% and for moistening the surface of each particle thereby forming agglomerates, and then instantly reducing the moisture content of the agglomerates to substantially the initial moisture content of said first mentioned conventional dry powdered milk particles by substantially immediately contacting the agglomerates with a hot air stream passing adjacent to the area in which the particles are moistened thereby forming instantly soluble agglomerates having a relatively large surface in relation to volume and ready for immediate use.

3. A method of converting conventional dry powdered milk particles having an initial moisture content of less than 4% into coarse agglomerates of loose porous structure which comprises producing in an enclosure a continuous stream of milk powder the particles of which fall downwardly by gravity and are positioned closely adjacent to one another, heating and wetting said particles by releasing a stream of steam into said stream of particles transversely of said stream of particles while they are close together for instantly increasing the moisture content of the milk powder to between about 4% to about 9% and for moistening the surface of each particle thereby forming agglomerates, and then instantly reducing the moisture content of the agglomerates to substantially the initial moisture content of said first mentioned conventional dry powdered milk particles by immediately contacting the agglomerates with a hot air stream passing immediately adjacent to the area in which the particles are moistened thereby forming instantly soluble agglomerates having a relatively large surface in relation to volume and ready for immediate use.

4. A product prepared by the method of claim 1.

References Cited in the file of this patent

UNITED STATES PATENTS

| | | |
|---|---|---|
| 1,928,135 | Peebles et al. | Sept. 26, 1933 |
| 2,016,592 | Chuck | Oct. 8, 1935 |
| 2,174,734 | Chuck | Oct. 3, 1939 |